(12) United States Patent
El-Gazzar et al.

(10) Patent No.: US 7,114,004 B2
(45) Date of Patent: Sep. 26, 2006

(54) PREMIUM MESSAGING EXCHANGE

(75) Inventors: Amin El-Gazzar, Key Biscayne, FL (US); Ralph Musgrove, Toronto (CA)

(73) Assignee: Vernall, Inc., Miami Beach, FL (US)

( * ) Notice: Subject to any disclaimer, the term of this patent is extended or adjusted under 35 U.S.C. 154(b) by 71 days.

(21) Appl. No.: 10/434,140

(22) Filed: May 8, 2003

(65) Prior Publication Data

US 2005/0021631 A1 Jan. 27, 2005

(51) Int. Cl.
*G06F 15/173* (2006.01)
(52) U.S. Cl. .................. 709/238; 709/241; 370/351; 370/401; 340/2.1; 358/1.15; 707/3
(58) Field of Classification Search ............ 709/201, 709/225, 226, 230, 237, 246, 203, 206, 220, 709/238, 241, 223, 224; 370/401, 351; 707/10, 707/3; 713/200; 705/29, 400; 340/2.1; 710/316; 358/1.15
See application file for complete search history.

(56) References Cited

U.S. PATENT DOCUMENTS

| | | | |
|---|---|---|---|
| 6,253,248 B1 * | 6/2001 | Nakai et al. .................. 709/237 |
| 6,498,835 B1 * | 12/2002 | Skladman et al. ....... 379/88.12 |
| 6,615,212 B1 * | 9/2003 | Dutta et al. .................... 707/10 |
| 6,683,883 B1 * | 1/2004 | Czeiger et al. ............. 370/401 |
| 6,792,461 B1 * | 9/2004 | Hericourt .................... 709/225 |
| 6,871,236 B1 * | 3/2005 | Fishman et al. ............ 709/246 |
| 6,873,620 B1 * | 3/2005 | Coveley et al. ........ 370/395.31 |
| 2001/0032232 A1 * | 10/2001 | Zombek et al. ............. 709/201 |
| 2002/0065938 A1 * | 5/2002 | Jungck et al. .............. 709/246 |
| 2002/0124094 A1 * | 9/2002 | Chang et al. ............... 709/230 |
| 2002/0143946 A1 * | 10/2002 | Crosson ...................... 709/226 |
| 2003/0217186 A1 * | 11/2003 | Bushey ....................... 709/250 |
| 2004/0034793 A1 * | 2/2004 | Yuan .......................... 713/200 |
| 2004/0095943 A1 * | 5/2004 | Korotin ...................... 370/401 |

OTHER PUBLICATIONS

*Avaya™ Univied Communication*, Avaya, <http://www.avaya.com.html>.
*Avaya TM Univied Communication Center (UCC) Release 1.0, Fact Sheet*, Avaya.
*ABS Fax from the web.com*, ABS Fax Techonologies, Inc. —Faxsimply Fax Broadcasting Services, pp. 1-2, (Jan. 20, 2003), <http://www.absfax.com/fftw.html>.
*Netscape Messaging Server 3.5 Evaluation Guide*, Netscape, pp. 1-4, (Jan. 20, 2003), ttp://wp.netscape.com/messaging/v3.5/evalguide/criteria.html>.
*Netscape Messaging Server 3.5 Evaluation Guide*, Netscape, pp. 1-5, (Jan. 20, 2003), ttp://wp.netscape.com/messaging/v3.5/evalguide/index.html>.
*Workshops Making Good Connections with x.400 & SMTP*, Network Computing, pp. 1-3, (Jan. 20, 2003), <http://www.networkcomputing.com/718/718w2.html>.

\* cited by examiner

*Primary Examiner*—ThuHa Nguyen
(74) *Attorney, Agent, or Firm*—Steven M. Greenberg; Carey Rodriguez Greenberg & Paul LLP

(57) ABSTRACT

A premium messaging exchange. The premium messaging exchange can include a list of destinations supported by the premium messaging exchange. Each record in the list can include a specified destination, and a supporting external messaging system. Finally, the premium messaging exchange can include an interface to the list which can be accessed by querying external messaging systems and through which supporting external messaging systems can be identified for specific destination addresses provided by the querying external messaging systems through the interface.

16 Claims, 2 Drawing Sheets

PREMIUM MESSAGING EXCHANGE

BACKGROUND OF THE INVENTION

1. Statement of the Technical Field

The present invention relates to the field of data communications and more particularly to electronic message routing in a heterogeneous data communications network.

2. Description of the Related Art

Messaging has become the lifeblood of enterprise infrastructure. In the past, information technologists tolerated poor electronic communications with both customers and suppliers. Presently, though, competitive market pressures have changed driving information technologists to seek messaging solutions that provide a lower cost of ownership while increasing the effectiveness and reliability of their communications network. Specifically, information technologies now recognize the benefits of an Internet standards-based messaging system. In this regard, standards-based messaging systems typically can include native or gateway support for one or more of SMTP, MIME, POP3, IMAP4, LDAP, SNMP, and SSL.

While some messaging system vendors include support for widely used messaging standards, others fail to incorporate support for all relevant standards. Still others fail to completely support application required messaging standards. In such cases, customers must compromise interoperability. In all cases, however, unless a messaging system has been configured to interoperate with all available messaging protocols and data formats, a gateway or connector will be required to translate a message from one data format to another.

The use of a gateway or connector to provide interoperability between disparate messaging systems has been considered deficient in terms of providing native support for multiple messaging standards. Specifically, it has been recognized by those skilled in the art that gateway or connector based support for multiple messaging standards can prove suboptimal in that such systems are considered proprietary and can produce mere marginal scalability and can be expensive. Accordingly, the use of gateways and connectors to process multiple messaging formats and protocols have been limited strictly to electronic mail systems.

Twenty-first century messaging extends far beyond simple electronic mail systems, and incorporates both Internet and conventional fax messaging, voice messaging, video conferencing and the like. Yet, the same interoperability problems exist in twenty-first century messaging which could be identified among simple electronic mail systems. For instance, Internet fax providers utilize disparate format and file types, while video conferencing systems rely upon several known protocols and formats. Similarly, voice mail systems differ generally from vendor to vendor, in both cellular and business telephone systems.

Notably, in the context of fax messaging, it can be advantageous to route a fax not through the PSTN where toll charges can be incurred, but through the Internet where at present no tolls can be incurred. The use of Internet fax routing can be particularly advantageous where a fax is to be broadcast to a destination which broadcast will incur long distance charges. To that end, fax delivery systems have been developed which can algorithmically select an optimal route for a particular fax destination which might include a PSTN segment, an Internet segment or a combination of both PSTN and Internet segments.

Still, the effectiveness of each route can be limited by the route knowledge associated with a specific destination for a particular fax document. In particular, where one fax network cannot provide a cost effective Internet route for a selected destination, another fax network might enjoy a configuration able to provide a cost effective Internet route. Still, as each fax network can process fax transmissions disparately, neither can interoperate with the other and an expensive PSTN route will be required. In this regard, interoperability does not exist between different fax networks.

Similarly, in the context of video conferencing, participants to a particular video conference must utilize end point communications equipment which processes digital video in a like manner, whether the manner is through PICTURE-TEL, or H.323 means. Different endpoints having disparate mechanisms for processing video and audio imagery cannot interoperate to facilitate a video conferencing session. Analogously, voice mail processed by a cellular phone system cannot easily be processed in a conventional PBX system disposed within the enterprise. Thus, there exists a long felt unsolved need for a unified messaging architecture able to facilitate the exchange of electronic messages across disparate messaging systems in a seamless manner.

SUMMARY OF THE INVENTION

The present invention is a premium messaging exchange which addresses the foregoing deficiencies of conventional message exchanges. Specifically, unlike conventional message exchanges, a premium message exchange can collect a list of destination addresses which are supported by affiliated external messaging systems, or by the premium messaging exchange itself. In this way, though any one external messaging system may not be able to support communications with a specific destination of disparate nature, the external messaging system can leverage the knowledgebase and capabilities of the premium messaging exchange to interoperate with the specified destination, notwithstanding the inherent disparities therebetween.

A premium messaging exchange can include a list of destinations supported by the premium messaging exchange. Each record in the list can include a specified destination, and a supporting external messaging system. Finally, the premium messaging exchange can include an interface to the list which can be accessed by querying external messaging systems and through which supporting external messaging systems can be identified for specific destination addresses provided by the querying external messaging systems through the interface.

Notably, in one aspect of the invention, the premium messaging exchange also can include a configuration database comprising specified destinations and corresponding suitable data formats and communications protocols. Translation logic further can be programmed to translate received messages into data formats suitable for corresponding specified destinations. Finally, a message router can be configured to route the translated received messages to the corresponding specified destinations. Importantly, each the supported external messaging system can include a messaging system selected from the group consisting of a broadcast fax system, an electronic mail system, and a video conferencing system. In yet another aspect of the invention, least cost routing logic can be programmed to compute a cost associated with a least cost route through which a particular electronic document can be transmitted through the premium messaging exchange to a specified destination in the list, which computed cost can be returned through the interface.

In an originating external messaging system, a premium messaging exchange method can include receiving in the originating external messaging system, a request to route data to a specified destination. A list of destinations can be queried to determine whether the specified destination can be processed in another external messaging system. If another external messaging system can process the data, the data first can be routed to the other external messaging system, through which the data can be routed directly to the specified destination. Otherwise, if another external messaging system cannot process the data, the data can be routed directly to the specified destination without assistance from the another external messaging system.

Notably, the receiving step can include the step of receiving in the originating messaging system, a request to route a facsimile document to a fax device at a specified destination. Also, the querying step can include determining a route for the facsimile document to the fax device at the specified destination and computing a cost for the determined route. Consequently, the list of destinations can be queried to determine whether the specified destination can be processed in another external broadcast faxing system. Finally, if another external messaging system can route the facsimile document to the fax device at the specified destination, the computed cost for the determined route can be compared to a cost for routing the facsimile document through the another external messaging system. Accordingly, a route can be selected for the facsimile document based upon the comparison; and, the facsimile document can be routed along the selected route.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a premium messaging exchange. The premium messaging exchange can provide an interface to external messaging systems through which the external messaging systems can forward data transmissions intended for destinations supported by the premium messaging exchange. The premium messaging exchange can suitably format and route the received data transmissions to respective intended destinations. Importantly, the external messaging systems can access the premium messaging exchange through the interface only where it can be confirmed by way of a specified destination that the premium messaging exchange can suitably format and route data transmissions to the specified destination.

Figure 1:
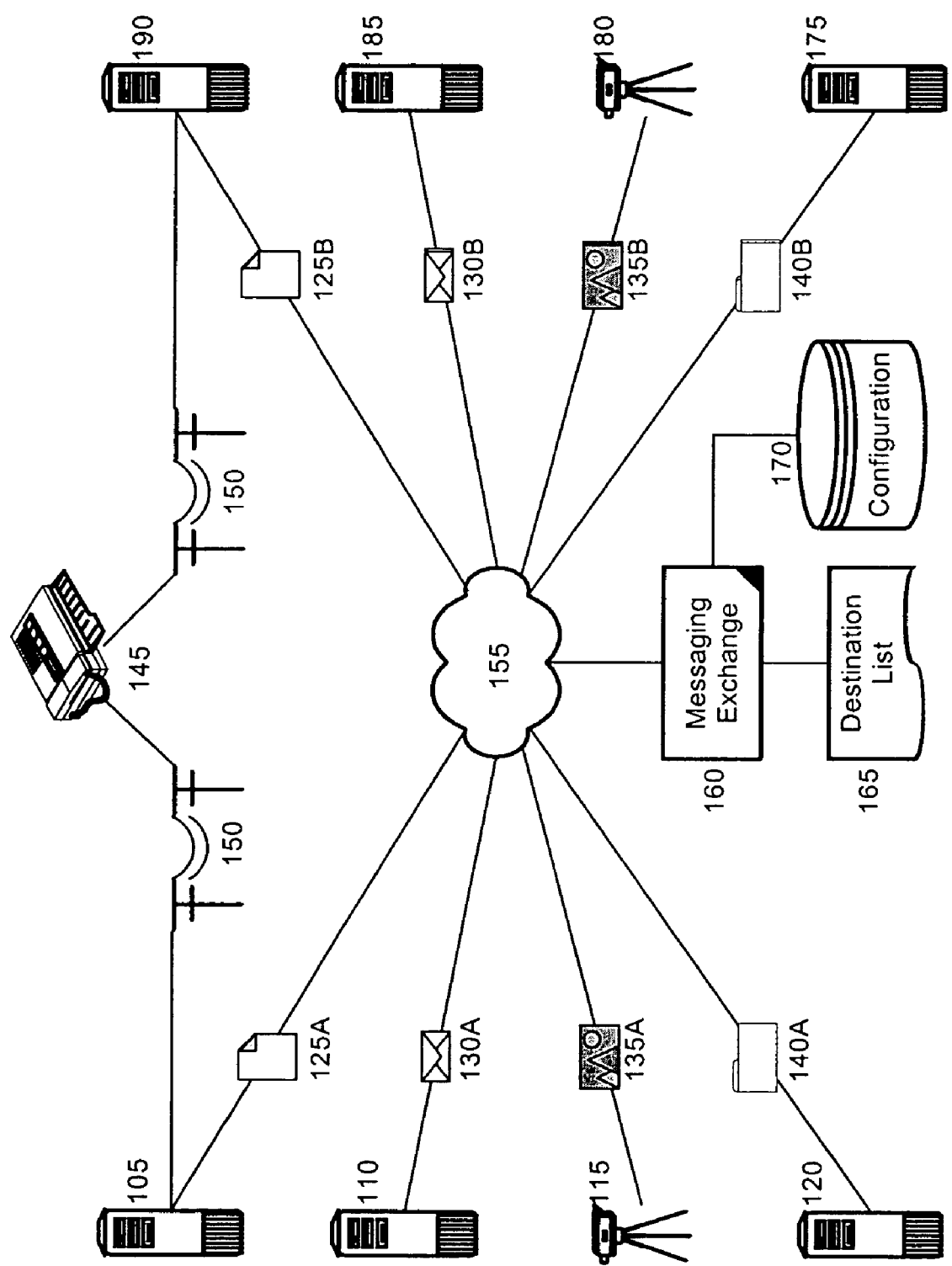
FIG. 1 is a schematic illustration of a network architecture which has been configured with the premium messaging exchange of the present invention.

FIG. 1 is a schematic illustration of a network architecture which has been configured with the premium messaging exchange of the present invention. The architecture can include one or more external messaging systems 105, 110, 115, 120, including for instance, a fax server 105, an e-mail server 110, a video conferencing server 115, and a file server 120. Each of the external messaging systems 105, 110, 115, 120 can be coupled to a global data communications network 155, for instance the Internet. Additionally, the fax server 105 can be coupled independently to a public switched telephone network (PSTN) 150.

In accordance with the present invention, each of the external messaging systems 105, 110, 115, 120 can route electronic data 125A, 130A, 135A, 140A to intended destination devices 175, 180, 185, 190 over the network 155. In this regard, "electronic data" as used herein can include facsimile formatted documents 125A, electronic mail 130A, digital video 135A and file objects 140A. Moreover, in the case of the fax server 105, the fax server 105 can directly route facsimile documents 125A to destination fax devices 145 over the PSTN 150. Notably, the intended destination devices 175, 180, 185, 190 can include by way of example a file server 175, a video conferencing server 180, an electronic mail server 185, and a fax server 190. As in the case of the fax server 105, the fax server 190 can be coupled directly to the PSTN 150.

Ordinarily, the external messaging systems 105, 110, 115, 120 can be limited in regard to the type of destination devices 175, 180, 185, 190 with which the external messaging systems 105, 110, 115, 120 can communicate. Specifically, disparate communications protocols and data formats can inhibit interoperability with the destination devices 175, 180, 185, 190. Additionally, limitations in the configuration of the external messaging systems 105, 110, 115, 120 can inhibit the optimization of data transmissions originating from the external messaging systems 105, 110, 115, 120. As an example, a limited Internet fax routing network can result in the fax server 105 being compelled to route a facsimile document 125 over the PSTN rather than through the data communications network 155.

To address the problem of disparate communications protocols between messaging entities, in accordance with the present invention, a premium messaging exchange 160 can be coupled to the external messaging systems 105, 110, 115, 120 over the data communications network 155. The premium messaging exchange 160, in turn, can be coupled both to a list of destination devices 165 and a configuration database 170. Using the premium messaging exchange 160, the external messaging systems 105, 110, 115, 120 can route data transmissions 125A, 130A, 135A, 140A to destination devices 175, 180, 185, 190 irrespective of the appropriate data format and communications protocol mandated by the destination devices 175, 180, 185, 190.

More specifically, an interface to the messaging exchange 160 can be exposed to each of the external messaging systems 105, 110, 115, 120. When one of the external messaging systems 105, 110, 115, 120 attempts to transmit electronic data 125A, 130A, 135A, 140A to a selected one of the destination servers 175, 180, 185, 190, the external messaging system 105, 110, 115, 120 first can query the premium messaging exchange 160 to determine whether the premium messaging exchange 160 has been configured to format and transmit data messages for delivery to the selected one of the destination servers 175, 180, 185, 190.

In particular, upon request the premium messaging exchange 160 can consult the list of destination devices 165 in this determination. If the external messaging systems 105, 110, 115, 120 chooses to use the premium messaging exchange 160 to forward the transmitted electronic data 125A, 130A, 135A, 140A to the selected one of the destination servers 175, 180, 185, 190, the premium messaging exchange 160 can consult the configuration database 170 to appropriately format the transmitted data 125A, 130A, 135A, 140A into a formatted message 125B, 130B, 135B, 140B suitable for processing in the selected one of the destination servers 175, 180, 185, 190.

Additionally, in the specific case of the transmission of facsimile data 125A, rather than transmitting the facsimile data 125A directly to a target fax device 145 over a more costly route in the PSTN 150, the fax server 105 can forward the facsimile data 125A to the premium messaging exchange 160 which can transform and route the facsimile data 125B through the data communications network 155 before forwarding the facsimile data 125 over a less costly route in the PSTN 150. Notably, the premium messaging exchange 160 can have particular value in the fax broadcasting market where individual broadcast fax vendors enjoy only a limited configuration for routing fax data globally. Consequently, without the benefit of the premium messaging exchange 160, individual broadcast fax vendors can incur unnecessary costs through the over-utilization of the PSTN 150. By comparison, though an individual broadcast fax vendor may not enjoy an expansive IP faxing network, through a communicatively coupling to the premium messaging exchange 160, the individual broadcast fax vendor still can capitalize on the reduced costs of Internet faxing afforded by the premium messaging exchange 160 of the present invention.

Notably, each of the external messaging systems 105, 110, 115, 120 can post individual supported destinations to the list of destinations 165. By posting individual supported destinations to the list of destinations 165, subsequent attempts by others of the external messaging systems 105, 110, 115, 120 to transmit data to one of the individual destinations in the posted portion of the list 165 can be handled by the posting one of the external messaging systems 105, 110, 115, 120. Alternatively, the posting one of the external messaging systems 105, 110, 115, 120 can provide suitable configuration data to the configuration database 170 so that the premium messaging exchange 160 can appropriately format and transmit received data to a specified destination.

Figure 2:
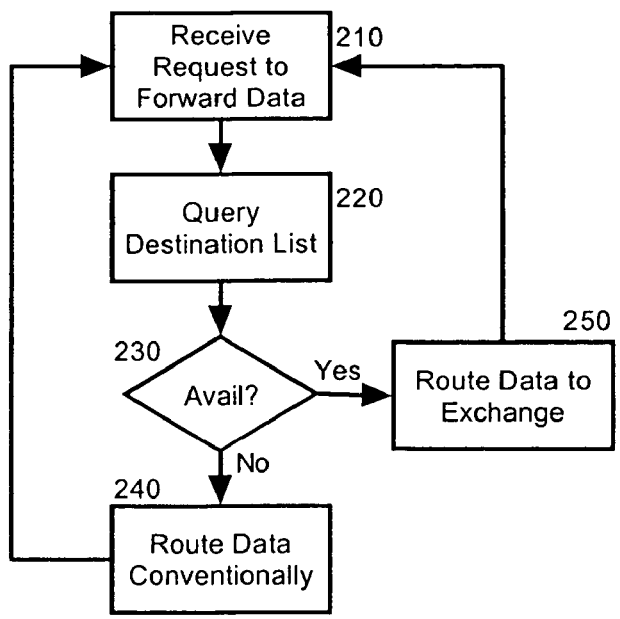
FIG. 2 is a flow chart illustrating a process for routing data through the premium messaging exchange of FIG. 1; and, FIG. 3 is a flow chart illustrating a process for least cost routing data through the premium messaging exchange of FIG. 1.

FIG. 2 is a flow chart illustrating a process for routing data through the premium messaging exchange of FIG. 1. Beginning in block 210, the external messaging system can receive a request to forward data to a specified destination. The data can include, for example, a facsimile document, electronic mail, a video conferencing session, voice mail, and the like. The specified destination, in turn, can include, for example, a facsimile machine, a fax server, an electronic mail server, a voice mail server, or a video conferencing terminal. In any case, the external messaging system can query the destination list of the premium messaging exchange to determine whether the premium messaging exchange can support data transfers with the specified destination.

If, in block 230, the premium messaging exchange can support data transfers with the specified destination, in block 250, the external messaging system can route the data to the premium messaging exchange rather than forwarding the data directly to the specified destination. The premium messaging exchange, in turn, can translate the data format of the data as necessary and can route the translated data to the specified data using a suitable communications protocol. Otherwise, in block 240, the external messaging system can route the data directly to the specified destination without further assistance from the premium messaging exchange.

Importantly, the premium messaging exchange of the present invention can facilitate the exchange of data between disparate external messaging systems which otherwise would not be possible. For instance, utilizing the premium messaging exchange, an integrated services digital network (ISDN) based video conferencing system can establish a video conference with a Microsoft Netmeeting™ based video conferencing system. Similarly, utilizing the premium messaging system, voice mail stored in a digital cellular telephone system can be transferred to a traditional PBX system.

Significantly, as the invention relates specifically to the exchange of messages between disparate external messaging systems, the premium messaging exchange can publish a list of supported destinations. In this regard, the term "supported" refers to the notion that the premium messaging exchange can:

1. Establish a communicative link with a messaging device at the specified destination;
2. Format data so that the data can be processed at the specified destination; and,
3. Forward the formatted data to the specified destination according to a communications protocol recognized by the specified destination.

As the notion of "supported" relates specifically to the specified destination and not the data to be transferred to the specified destination, the list of destinations which can be accessed through the interface can provide a determination based upon a specified destination. For instance, the presence of a specific destination in the list can indicate that the premium messaging exchange can support communications with the specified destination, whereas the absence of a specified destination in the list can indicate that the premium messaging exchange has not been specifically configured to communicate with the specified destination. It will be recognized by one skilled in the art that the foregoing can be distinguished from the conventional messaging exchange in which a "supported" determination can be based exclusively on the type of data to be route through the messaging exchange and not the destination itself.

Figure 3:
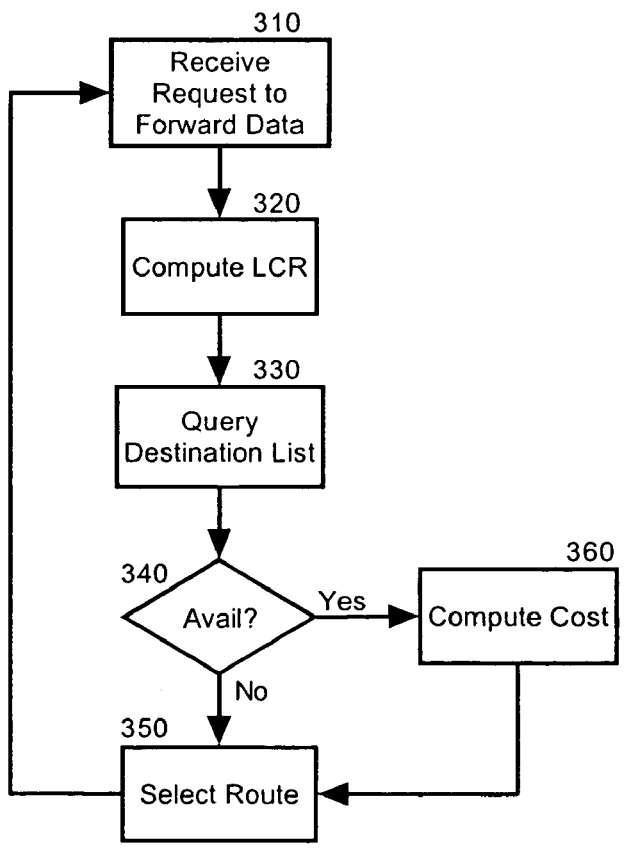

The skilled artisan will recognize that the premium messaging exchange of the present invention can have specific application to the art of least cost routing (LCR). In that regard, FIG. 3 is a flow chart illustrating a process for least cost routing data through the premium messaging system of FIG. 1. Beginning in block 310, a fax server can receive a request to transmit a facsimile document to a destination address. In block 320, the fax server can compute the LCR for the destination address and, accordingly, the fax server can determine an optimal route to the destination, whether via the Internet, the PSTN, or both. Notably, by "optimal" it is meant not only that the most cost effective route is chosen, but also that the most reliable and the most cost effective route is chosen.

It can be presumed that the LCR for the destination address may not be optimal when considering the available resources of other broadcast faxing networks. As a result, in block 330, the destination list of the premium messaging exchange can be consulted to determine whether the premium messaging exchange also can route facsimile documents of the specified destination. In this regard, the list can be accessed through an interface to a remotely positioned list. Alternatively, the list can be distributed (and maintained in a peer-to-peer fashion). In either case, from the list, it can be determined whether the premium messaging exchange can process facsimile documents to the destination address.

If in block 340, it is determined that the premium messaging exchange cannot process the specified destination, in block 350 the route can be selected based upon the LCR determination of block 320. Notwithstanding, if in block 340 it is determined that the premium messaging exchange can process the specified destination, in block 360 the cost can be computed for routing the facsimile document through the premium messaging exchange. Importantly, the cost can be computed either as a contractually pre-negotiated toll, or according to the LCR computing logic of the premium messaging exchange itself. In either case, the cost figure produced in block 360 can be combined with the LCR analysis of block 320 to select an optimal route in block 350.

Notably, the method of the present invention can be realized in hardware, software, or a combination of hardware and software. An implementation of the heuristic routing method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A premium messaging exchange system, comprising:
   a list of destinations supported by the premium messaging exchange system, each record in said list of destinations comprising a specified destination, and a supporting external messaging system enabled to establish a communicative link with said specified destination, to format data so that said data can be processed at said specified destination, and to transmit said data once formatted to said specified destination according to a protocol recognized by said specified destination; and,
   an interface to said list of destinations which can be accessed by querying external messaging systems and through which supporting external messaging systems can be identified for specific destination addresses provided by said querying external messaging systems through said interface to said querying external messaging system; and
   an originating external messaging system configured to receive reguests to route data to specified destinations and to query said list of destinations through said interface to determine whether said specified destination can be processed in another external messaging system, if yes, first routing said data to said another external messaging system, said another external messaging system routing said data directly to said specified destination, if no, second routing said data directly to said specified destination without assistance from said another external messaging system.

2. The premium messaging exchange system of claim 1, further comprising:
   a configuration database comprising specified destinations and corresponding suitable data formats and communications protocols;
   translation logic programmed to translate received messages into data formats suitable for corresponding specified destinations; and
   a message router configured to route said translated received messages to said corresponding specified destinations.

3. The premium messaging exchange system of claim 1, wherein each said supporting external messaging system comprises a messaging system selected from the group consisting of a broadcast fax system, an electronic mail system, and a video conferencing system.

4. The premium messaging exchange system of claim 1, further comprising least cost routing logic programmed to compute a cost associated with a least cost route through which a particular electronic document can be transmitted through the premium messaging exchange system to a specified destination in said list of destinations, which computed cost can be returned through said interface.

5. In an originating external messaging system, a premium messaging exchange method comprising the steps of:
   receiving in the originating external messaging system, a request to route data to a specified destination;
   confirming by way of a specified destination that another external messaging system can suitably format and route data transmissions to said specified destination, said confirming comprising accessing a list of destinations through an interface to said list of destinations, each record in said list of destinations comprising a specified destination, and a supporting external messaging system enabled to establish a communicative link with said specified destination, to format data so that said data can be processed at said specified destination, and to transmit said data once formatted to said specified destination according to a protocol recognized by said specified destination;
   if another external messaging system can process said data, first routing said data to said another external messaging system, said another external messaging system routing said data directly to said specified destination; and
   if another external messaging system cannot process said data, second routing said data directly to said specified destination without assistance from said another external messaging system. interface.

6. The method of claim 5, wherein said receiving step comprises the step of receiving in the originating messaging system, a request to route a facsimile document to a fax device at a specified destination.

7. The method of claim 6, wherein said confirming step comprises the steps of:
   determining a route for said facsimile document to said fax device at said specified destination and computing a cost for said determined route; and,
   querying said list of destinations to determine whether said specified destination can be processed in another external broadcast faxing system.

8. The method of claim 7, wherein said first routing step comprises the steps of:
   if another external messaging system can route said facsimile document to said fax device at said specified destination, comparing said computed cost for said determined route to a cost for routing said facsimile document through said another external messaging system, and selecting a route for said facsimile document based upon said comparison; and, routing said facsimile document along said selected route.

9. The method of claim 5, wherein said receiving step comprises the step of receiving in the originating messaging system, a request to establish a video conference with a video conferencing system at a specified destination.

10. The method of claim 5, wherein said receiving step comprises the step of receiving in the originating messaging system, a request to transfer a voice mail message to a voice mailbox at a specified destination.

11. A machine readable storage having stored thereon a computer program for a premium messaging exchange, said computer program comprising a routine set of instructions for causing a machine to perform the steps of:

receiving in an originating external messaging system, a request to route data to a specified destination;

confirming by way of a specified destination that another external messaging system can suitably format and route data transmissions to said specified destination, said confirming comprising accessing a list of destinations through an interface to said list of destinations, each record in said list of destinations comprising a specified destination, and a supporting external messaging system enabled to establish a communicative link with said specified destination, to format data so that said data can be processed at said specified destination, and to transmit said data once formatted to said specified destination according to a protocol recognized by said specified destination;

if another external messaging system can process said data, first routing said data to said another external messaging system, said another external messaging system routing said data directly to said specified destination; and if another external messaging system cannot process said data, second routing said data directly to said specified destination without assistance from said another external messaging system.

12. The machine readable storage of claim 11, wherein said receiving step comprises the step of receiving in the originating messaging system, a request to route a facsimile document to a fax device at a specified destination.

13. The machine readable storage of claim 12, wherein said confirming step comprises the steps of:

determining a route for said facsimile document to said fax device at said specified destination and computing a cost for said determined route; and, querying said list of destinations to determine whether said specified destination can be processed in another external broadcast faxing system.

14. The machine readable storage of claim 13, wherein said first routing step comprises the steps of:

if another external messaging system can route said facsimile document to said fax device at said specified destination, comparing said computed cost for said determined route to a cost for routing said facsimile document through said another external messaging system, and selecting a route for said facsimile document based upon said comparison; and, routing said facsimile document along said selected route.

15. The machine readable storage of claim 11, wherein said receiving step comprises the step of receiving in the originating messaging system, a request to establish a video conference with a video conferencing system at a specified destination.

16. The machine readable storage of claim 11, wherein said receiving step comprises the step of receiving in the originating messaging system, a request to transfer a voice mail message to a voice mailbox at a specified destination.

* * * * *

UNITED STATES PATENT AND TRADEMARK OFFICE
CERTIFICATE OF CORRECTION

PATENT NO.         : 7,114,004 B2                                                  Page 1 of 1
APPLICATION NO.    : 10/434140
DATED              : September 26, 2006
INVENTOR(S)        : El-Gazzar et al.

It is certified that error appears in the above-identified patent and that said Letters Patent is hereby corrected as shown below:

On Title Page, Item (73) Assignee should read -- Venali, Inc., Miami, FL. --

Signed and Sealed this

Second Day of January, 2007

JON W. DUDAS
*Director of the United States Patent and Trademark Office*

(12) EX PARTE REEXAMINATION CERTIFICATE (7279th)
United States Patent
El-Gazzar et al.

(10) Number: US 7,114,004 C1
(45) Certificate Issued: Dec. 29, 2009

(54) PREMIUM MESSAGING EXCHANGE

(75) Inventors: Amin El-Gazzar, Key Biscayne, FL (US); Ralph Musgrove, Toronto (CA)

(73) Assignee: Venali, Inc., Miami Beach, FL (US)

Reexamination Request:
No. 90/008,668, May 17, 2007

Reexamination Certificate for:
Patent No.: 7,114,004
Issued: Sep. 26, 2006
Appl. No.: 10/434,140
Filed: May 8, 2003

Certificate of Correction issued Jan. 2, 2007.

(51) Int. Cl.
*G06F 15/173* (2006.01)

(52) U.S. Cl. ............. 709/328; 340/2.1; 358/1.15; 370/351; 370/401; 707/3; 709/241

(58) Field of Classification Search ............. None
See application file for complete search history.

(56) References Cited

U.S. PATENT DOCUMENTS

| 5,854,893 | A | 12/1998 | Ludwig et al. |
| 6,020,980 | A | 2/2000 | Freeman |
| 6,266,160 | B1 | 7/2001 | Saito et al. |
| 6,295,350 | B1 | 9/2001 | Schreyer et al. |
| 6,498,835 | B1 | 12/2002 | Skladman et al. |
| 6,690,480 | B2 | 2/2004 | Maeda |
| 6,795,108 | B2 | 9/2004 | Jarboe et al. |
| 6,825,955 | B1 | 11/2004 | Shibata |

*Primary Examiner*—Scott L. Weaver

(57) ABSTRACT

A premium messaging exchange. The premium messaging exchange can include a list of destinations supported by the premium messaging exchange. Each record in the list can include a specified destination, and a supporting external messaging system. Finally, the premium messaging exchange can include an interface to the list which can be accessed by querying external messaging systems and through which supporting external messaging systems can be identified for specific destination addresses provided by the querying external messaging systems through the interface.

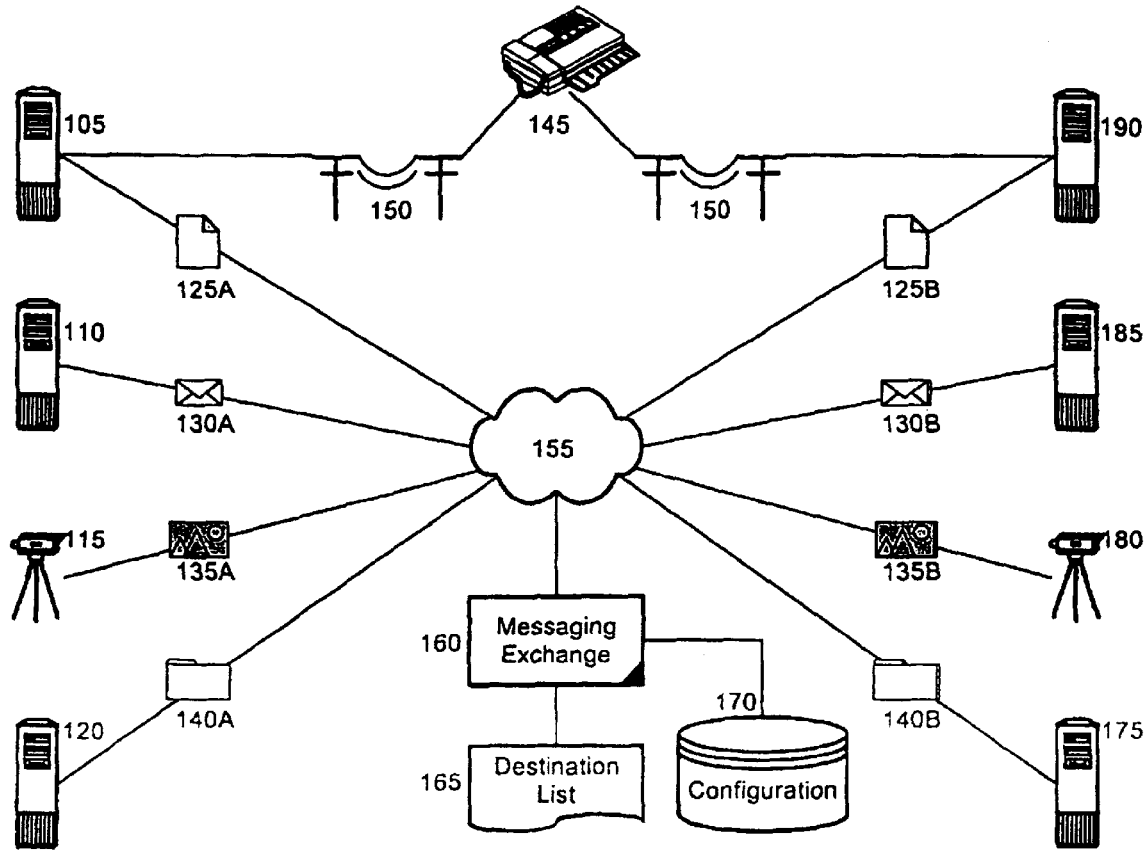

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–4 and 10–16 is confirmed.

Claim 5 is determined to be patentable as amended.

Claims 6–9, dependent on an amended claim, are determined to be patentable.

5. In an originating external messaging system, a premium messaging exchange method comprising the steps of:
receiving in the originating external messaging system, a request to route data to a specified destination; confirming by way of a specified destination that another external messaging system can suitably format and route data transmissions to said specified destination, said confirming comprising accessing a list of destinations through an interface to said list of destinations, each record in said list of destinations comprising a specified destination, and a supporting external messaging system enabled to establish a communicative link with said specified destination, to format data so that said data can be processed at said specified destination, and to transmit said data once formatted to said specified destination according to a protocol recognized by said specified destination;

if another external messaging system can process said data, first routing said data to said another external messaging system, said another external messaging system routing said data directly to said specified destination; and if another external messaging system cannot process said data, second routing said data directly to said specified destination without assistance from said another external messaging system[.] *interface.*

\* \* \* \* \*